(12) United States Patent
Guo et al.

(10) Patent No.: US 10,116,010 B2
(45) Date of Patent: Oct. 30, 2018

(54) INSULATING MOTHER BOARD, INSULATING HARNESS MOTHER BOARD ASSEMBLY AND BATTERY MODULE

(71) Applicant: CHINA AVIATION LITHIUM BATTERY CO., LTD., Luoyang, Henan (CN)

(72) Inventors: Qixin Guo, Henan (CN); Yong Cao, Henan (CN); Qiu Xie, Henan (CN); Wei Li, Henan (CN)

(73) Assignee: CHINA AVIATION LITHIUM BATTERY CO., LTD., Luoyang, Henan (CN)

( * ) Notice: Subject to any disclaimer, the term of this patent is extended or adjusted under 35 U.S.C. 154(b) by 95 days.

(21) Appl. No.: 15/129,745

(22) PCT Filed: Sep. 15, 2015

(86) PCT No.: PCT/CN2015/089590
§ 371 (c)(1),
(2) Date: Sep. 27, 2016

(87) PCT Pub. No.: WO2017/024657
PCT Pub. Date: Feb. 16, 2017

(65) Prior Publication Data
US 2017/0179541 A1    Jun. 22, 2017

(30) Foreign Application Priority Data

Aug. 12, 2015 (CN) .......................... 2015 1 0491438

(51) Int. Cl.
*H01M 10/42* (2006.01)
*H01M 2/20* (2006.01)
*H01M 2/26* (2006.01)

(52) U.S. Cl.
CPC .......... *H01M 10/425* (2013.01); *H01M 2/202* (2013.01); *H01M 2/26* (2013.01); *H01M 10/42* (2013.01); *H01M 2010/4271* (2013.01)

(58) Field of Classification Search
CPC ...... H01M 10/42; H01M 10/425; H01M 2/20; H01M 2/202
See application file for complete search history.

(56) References Cited

U.S. PATENT DOCUMENTS

| | | | |
|---|---|---|---|
| 9,028,996 B2 | 5/2015 | Yoshioka | |
| 2013/0095359 A1* | 4/2013 | Yoshioka | H01M 2/1016 429/99 |
| 2014/0127555 A1* | 5/2014 | Ishibashi | H01M 2/1077 429/160 |

FOREIGN PATENT DOCUMENTS

| | | |
|---|---|---|
| CN | 201243072 Y | 5/2009 |
| CN | 103035875 A | 4/2013 |

(Continued)

OTHER PUBLICATIONS

English Translation of the 1st Office Action for CN201510491438.9, dated Jul. 5, 2017.

(Continued)

*Primary Examiner* — Karie O'Neill Apicella
(74) *Attorney, Agent, or Firm* — U.S. Fairsky LLP; Yue (Robert) Xu (57) ABSTRACT

An insulating mother board, an insulating harness mother board assembly and a battery module including the insulating mother board are provided. The insulating mother board includes a first end insulating board, a middle insulating board and a second end insulating board moveably connected in sequence. According to the insulating mother board, an arbitrary number of middle insulating boards can be arranged by arranging the first end insulating board and the second end insulating board on two ends of the insulating (Continued)

mother board respectively. There may be an arbitrary number of connection holes on the first end insulating board, the middle insulating board and the second end insulating board, each connection hole corresponds to one single battery. In this way, an assembly of different numbers of single batteries can be achieved.

9 Claims, 8 Drawing Sheets

(56) References Cited

FOREIGN PATENT DOCUMENTS

| CN | 103296233 A | 9/2013 |
|----|-------------|--------|
| CN | 203826444 U | 9/2014 |
| EP | 2575193 A1 | 4/2013 |
| JP | 2009266614 A | 11/2009 |
| JP | 2010114025 A | 5/2010 |
| WO | 2011078220 A1 | 6/2011 |

OTHER PUBLICATIONS

European Search Report regarding Application No. 15885768.0 dated Dec. 4, 2017.
International Search Report for PCT/CN2015/089590, dated Apr. 26, 2016, ISA/CN.

* cited by examiner

INSULATING MOTHER BOARD, INSULATING HARNESS MOTHER BOARD ASSEMBLY AND BATTERY MODULE

The present application is a National Stage application of PCT international application PCT/CN2015/089590, filed on Sep. 15, 2015 which claims the priority to Chinese Patent Application No. 201510491438.9, titled "INSULATING MOTHER BOARD, INSULATING HARNESS MOTHER BOARD ASSEMBLY AND BATTERY MODULE", filed on Aug. 12, 2015 with the State Intellectual Property Office of the PRC, both of which are incorporated herein by reference in their entireties.

FIELD

The present disclosure relates to the technology field of battery assembly, and in particular to an insulating mother board, an insulating harness mother board assembly and a battery module.

BACKGROUND

With environment and energy problems becoming increasingly serious, the low-carbon and environment-friendly energy source has become an inevitable choice of future economic development. An electric vehicle as a representation of a new energy vehicle has been gradually developed and accepted by consumers and supported by the government. A power battery module which is a main power source of the new energy vehicle has been a major component and a key technology of the electric vehicle.

At present, the biggest bottleneck of development of the electric vehicle is a limitation of mileage. Simply increasing the number of batteries may increase the total power of a system, however, weight of the system is also increased and the cost of the system is also largely increased, therefore, improving energy density of the power battery module is good to break through the bottleneck. In a case that the energy density of a single battery can not be further improved due to restriction of development degree of the technology, the most effective way to improve the energy density of the power battery module and the mileage of the electric vehicle is to optimize constituent of components of the battery module, which is to reduce the volume and weight of the battery module as far as possible on the premise of ensuring the safety, stabilization and performance requirements. In addition, specifications of power source systems used by various types of electric vehicles have not yet form a uniform standard at present, sizes and shapes of installation spaces reserved for the power battery modules are different. In a case that multiple single batteries are adopted to form a battery module, flexibility of an insulating mother board is too low to achieve an assembly of different numbers of the single batteries and an assembly of the single batteries with different standards.

Therefore, it is a technical problem to be urgently solved by those skilled in the art that how to provide an insulating mother board to achieve the assembly of different numbers of the single batteries and the assembly of the single batteries with different standards.

SUMMARY

In view of the above, the object of the present disclosure is to provide an insulating mother board to achieve an assembly of different numbers of single batteries and an assembly of the single batteries with different standards.

In order to achieve the above object, the disclosure provides the following technical solutions.

An insulating mother board includes a first end insulating board, a middle insulating board and a second end insulating board connected in sequence. A first protrusion is arranged on the left of a bottom of the first end insulating board, and a first groove is arranged on the right of the bottom of the first end insulating board. A second groove is arranged on the left of a top of the second end insulating board, and a second protrusion is arranged on the right of the top of the second end insulating board. A middle first groove is arranged on the left of a top of the middle insulating board, a middle first protrusion is arranged on the right of the top of the middle insulating board, a middle second protrusion is arranged on the left of a bottom of the middle insulating board, and a middle second groove is arranged on the right of the bottom of the middle insulating board. The first protrusion, the second protrusion, the middle first protrusion and the middle second protrusion have a same structure. The first groove, the second groove, the middle first groove and the middle second groove have a same structure. The first protrusion is inserted into the middle first groove, and the middle second protrusion is inserted into the second groove. The second protrusion is inserted into the middle second groove, and the middle first protrusion is inserted into the first groove. The first protrusion is a double layer stepped protrusion, and the first groove is a double layer stepped groove. A connection hole configured to connect a conductive connection strip and a battery post is arranged on each of the first end insulating board, the second end insulating board and the middle insulating board.

Preferably, half of the connection hole may be arranged on each of the bottom of the first end insulating board, the top of the middle insulating board, the bottom of the middle insulating board and the top of the second end insulating board. All halves of connection holes may be butted to form integral connection holes when the first end insulating board, the middle insulating board and the second end insulating board are connected in sequence.

Preferably, two rows of connection holes may be arranged with an interval on each of the first end insulating board, the second end insulating board and the middle insulating board. A first connection board may be arranged between the two rows of the connection holes of the first end insulating board, and a first boss and a first recess may be arranged at a bottom of the first connection board side by side. A second connection board may be arranged between the two rows of the connection holes of the second end insulating board, and a second boss and a second recess may be arranged at a top of the second connection board side by side. A middle connection board may be arranged between the two rows of the connection holes of the middle insulating board, a first middle boss and a first middle recess may be arranged at a top of the middle connection board side by side, and a second middle boss and a second middle recess may be arranged at a bottom of the middle connection board side by side. The first boss may be inserted into the first middle recess, the first middle boss may be inserted into the first recess, the second boss may be inserted into the second middle recess, and the second middle boss may be inserted into the second recess.

Preferably, a wire slot may be arranged on a side of each of the first connection board, the second connection board and the middle connection board.

Preferably, the first protrusion may be a trapezoid protrusion, and the first groove may be a trapezoid groove.

An insulating harness mother board assembly is provided according to the disclosure. The insulating harness mother board assembly includes any one of the insulating mother boards described above and the conductive connection strip, the conductive connection strip covers a same row of connection holes on the first end insulating board, the second end insulating board and the middle insulating board.

Preferably, a through hole may be arranged in a part of the conductive connection strip covering the connection hole, and a check bolt may pass through the through hole and may be screwed into the battery post having an internally threaded hole.

A battery module is provided according to the disclosure. The battery module includes a box and a single battery and any one of the insulating harness mother board assemblies described above. The single battery is placed in the box, and the insulating harness mother board assembly lies above the single battery.

Preferably, any two single batteries may be fixed to each other by means of a structural adhesive, cushioning pads may be arranged between the single battery and two ends of the box, the cushioning pads and the single battery may be fixed to each other by means of the structural adhesive, and the cushioning pads and the box may be fixed to each other by means of the structural adhesive.

Preferably, a mounting ear may be arranged on an outer wall at each of two ends of the box, and a mounting hole may be arranged on the mounting ear.

The insulating mother board according to the disclosure includes the first end insulating board, the middle insulating board and the second end insulating board connected in sequence. The first protrusion is arranged on the left of the bottom of the first end insulating board, and the first groove is arranged on the right of the bottom of the first end insulating board. The second groove is arranged on the left of the top of the second end insulating board, and the second protrusion is arranged on the right of the top of the second end insulating board. The middle first groove is arranged on the left of the top of the middle insulating board, the middle first protrusion is arranged on the right of the top of the middle insulating board, the middle second protrusion is arranged on the left of the bottom of the middle insulating board, and the middle second groove is arranged on the right of the bottom of the middle insulating board. The first protrusion, the second protrusion, the middle first protrusion and the middle second protrusion have a same structure. The first groove, the second groove, the middle first groove and the middle second groove have a same structure. The first protrusion is inserted into the middle first groove, and the middle second protrusion is inserted into the second groove. The second protrusion is inserted into the middle second groove, and the middle first protrusion is inserted into the first groove. The first protrusion is the double layer stepped protrusion, and the first groove is the double layer stepped groove. The connection hole configured to connect the conductive connection strip and the battery post is arranged on each of the first end insulating board, the second end insulating board and the middle insulating board. In the use of the insulating mother board, because the first end insulating board, the middle insulating board and the second end insulating board are moveably connected, an arbitrary number of middle insulating boards can be arranged by arranging the first end insulating board and the second end insulating board on two ends of the insulating mother board respectively. There may be an arbitrary number of connection holes on the first end insulating board, the middle insulating board and the second end insulating board. Each connection hole corresponds to one single battery, in this way, an assembly of different numbers of single batteries can be achieved by only controlling the number of the middle insulating boards and the connection holes. In addition, since the connection hole is used to connect the conductive connection strip and the battery post, an assembly of the single batteries with different standards can be achieved at the same time. As long as the single battery has the structure of the battery post, the assembly of the single batteries with different standards can be completely achieved with the connection hole.

Figure 3:
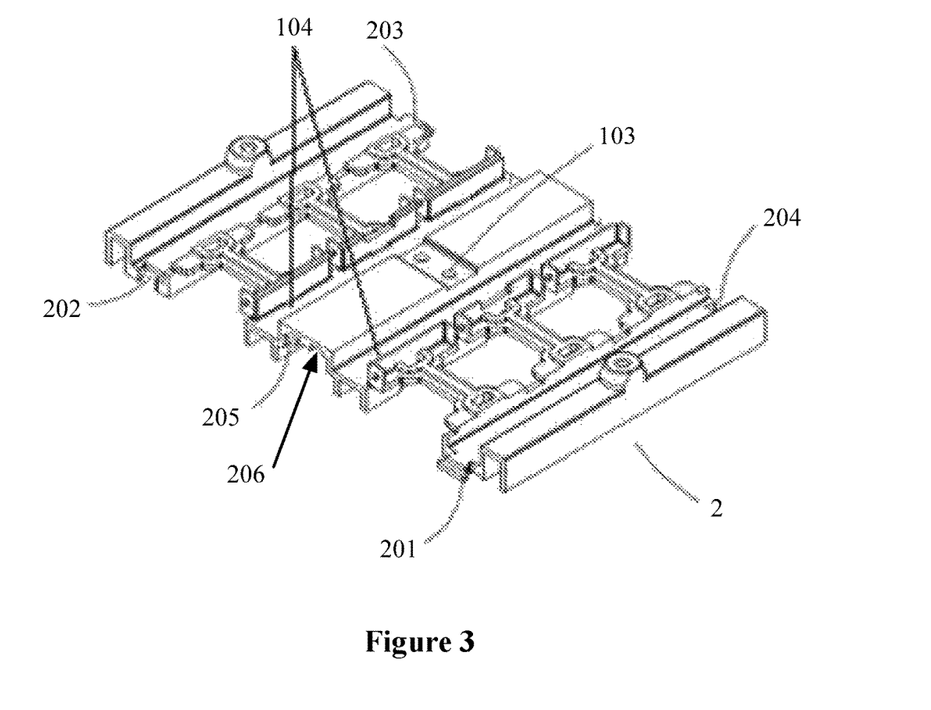
FIG. 3 is a schematic structural diagram of a front side of a middle insulating board according to an embodiment of the disclosure.

In addition, the first protrusion is the double layer stepped protrusion, and the first groove is the double layer stepped groove. Taking a side of the insulating mother board away from the single battery when the insulating mother board covers the single battery as an upper side, an upper protrusion of the double layer stepped protrusion is short, a lower protrusion of the double layer stepped protrusion is long, and correspondingly, an upper groove of the double layer stepped groove is short, a lower groove of the double layer stepped groove is long. When the double layer stepped protrusion is inserted into the double layer stepped groove, as shown in FIG. 3, the short protrusion is inserted into the upper groove and location of the protrusion is restricted by the groove, which can restrict movement of the first protrusion in a horizontal direction; and the long protrusion is inserted into the lower groove and is blocked by a lower wall of the upper groove, movement of the first protrusion in a vertical direction is restricted. In this way, the connection is stable, and the usage effect is better.

In the above FIG. 1 to FIG. 9: first end insulating board 1, first protrusion 101, first groove 102, wire card fixing hole 103, wire slot 104, first connection board 105, middle insulating board 2, middle first protrusion 201, middle first groove 202, middle second protrusion 203, middle second groove 204, first middle recess 205, middle connection board 206, second middle boss 207, second end insulating board 3, second protrusion 301, second groove 302, connection hole 303, second recess 304, lower wall 305 of an upper groove, fixed snap fit 306, moveable snap fit 307, locating pin 308, second connection board 309, conductive connection strip 4, through hole 401, part 402 of the conductive connection strip covering the connection hole, locating hole 403, insulating cover 501, upper hold-down strip 502, side hold-down strip 503, mounting ear 504, end fixing board 505, U-shaped insulating board 506, cushioning pad 507, check bolt 508, mounting hole 509, single battery 6, battery post 601, box 7, and structural adhesive 701.

DETAILED DESCRIPTION

To make the object, technical solutions and advantages of the embodiments of the present disclosure clear, technical solutions of the embodiments of the present disclosure are illustrated clearly and completely in conjunction with drawings of the embodiments of the disclosure. Apparently, the described embodiments are merely a few rather than all of the embodiments of the present disclosure. All other embodiments obtained by persons of ordinary skill in the art based on the embodiments of the present disclosure without creative efforts shall fall within the protection scope of the present disclosure.

Figure 1:
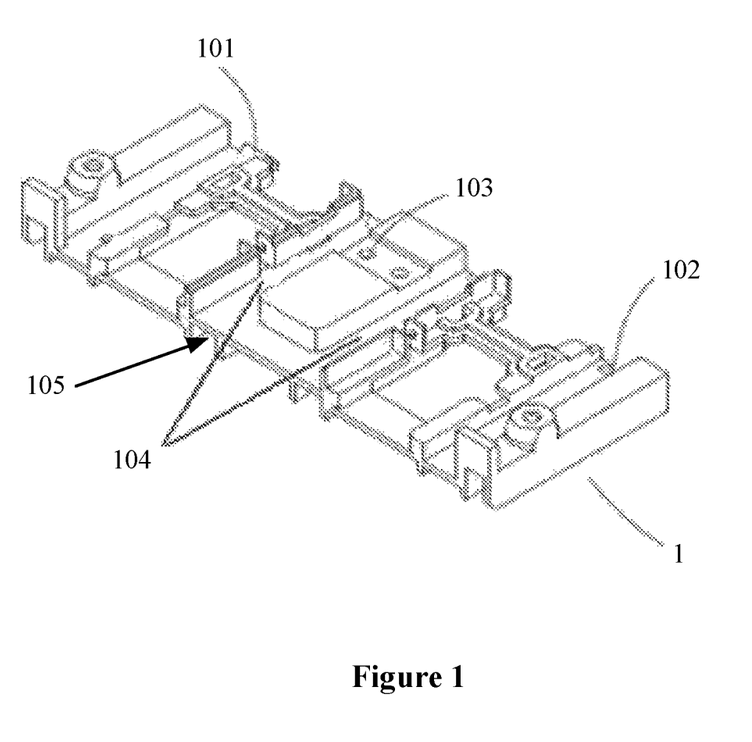
FIG. 1 is a schematic structural diagram of a front side of a first end insulating board according to an embodiment of the disclosure.
Figure 2:
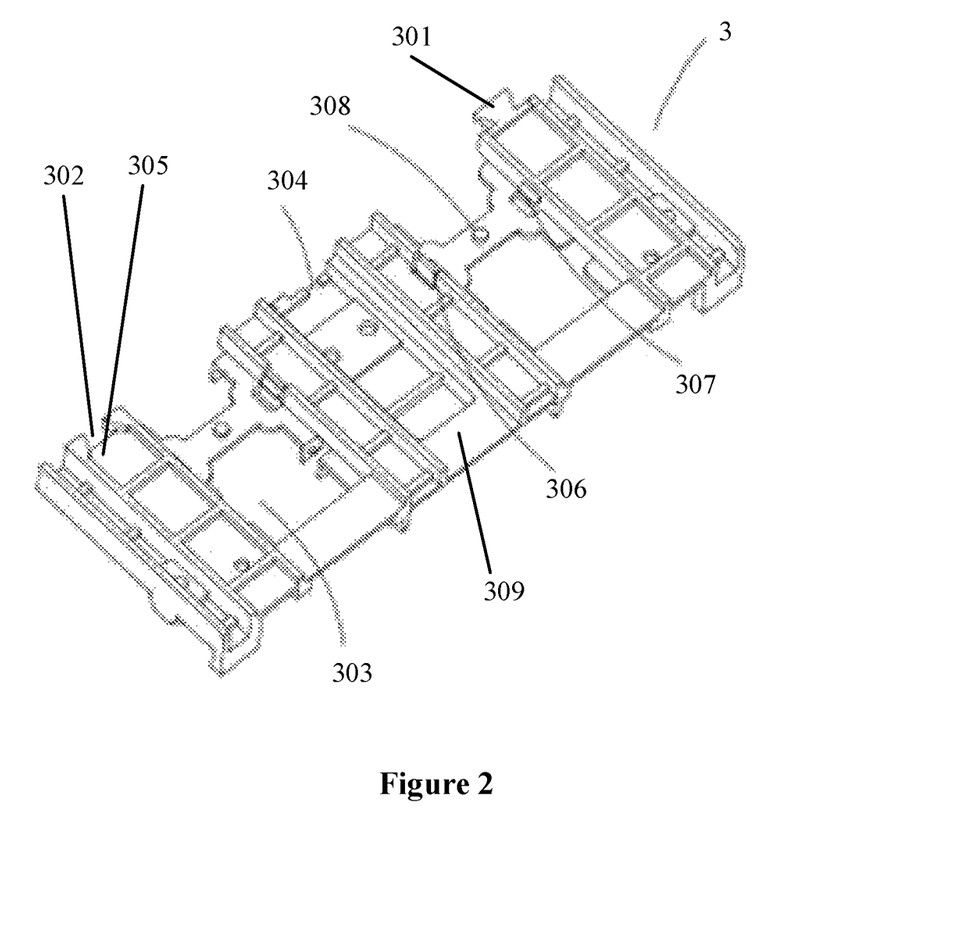
FIG. 2 is a schematic structural diagram of a back side of a second end insulating board according to an embodiment of the disclosure.
Figure 4:
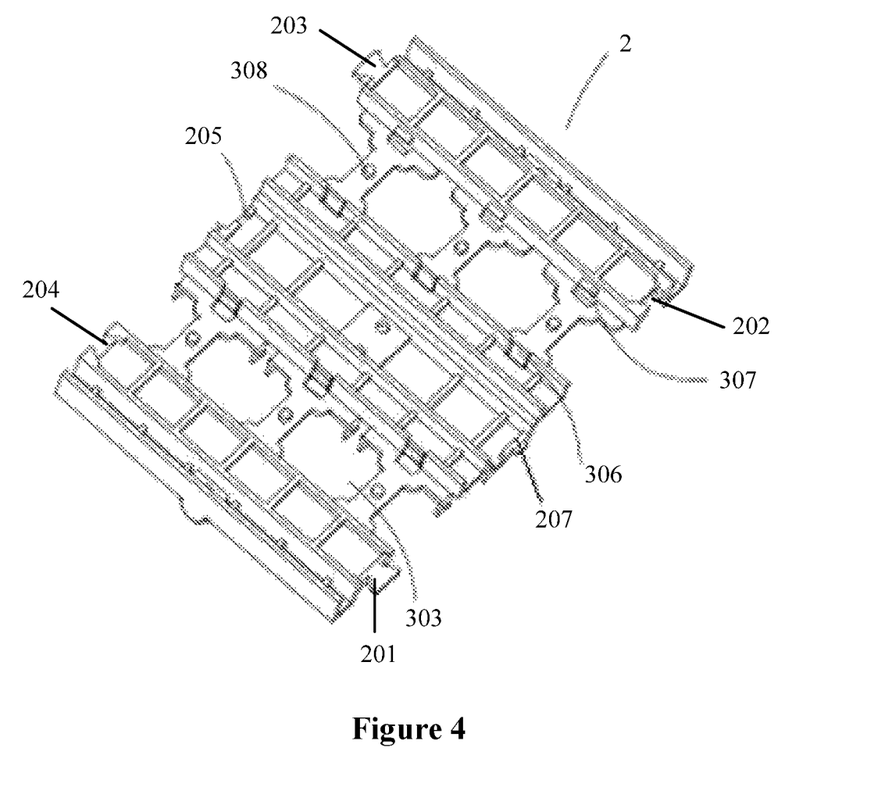
FIG. 4 is a schematic structural diagram of a back side of a middle insulating board according to an embodiment of the disclosure.
Figure 5:
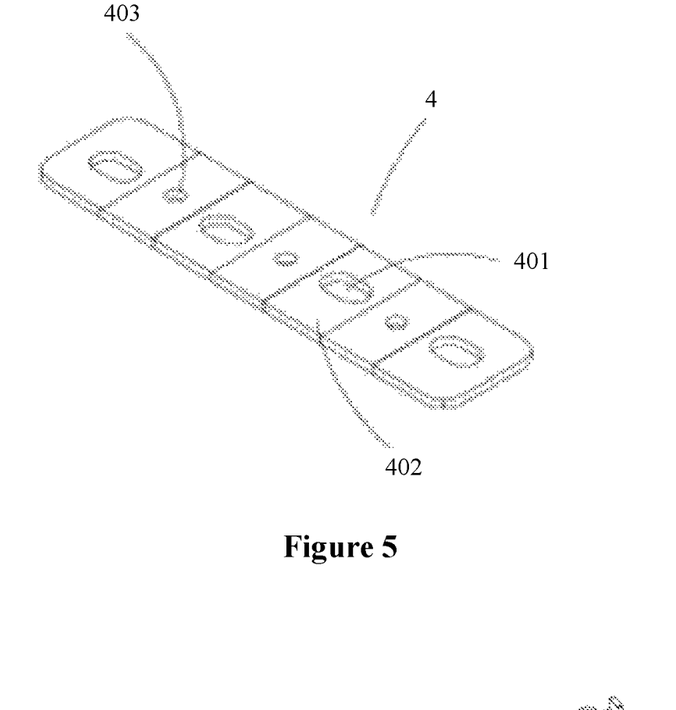
FIG. 5 is a schematic structural diagram of a conductive connection strip according to an embodiment of the disclosure.
Figure 6:
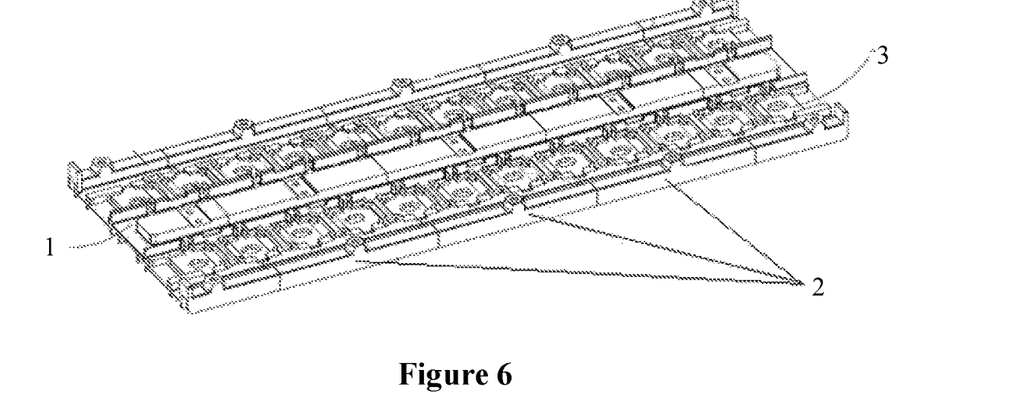
FIG. 6 is a schematic structural diagram of an insulating mother board according to an embodiment of the disclosure.
Figure 7:
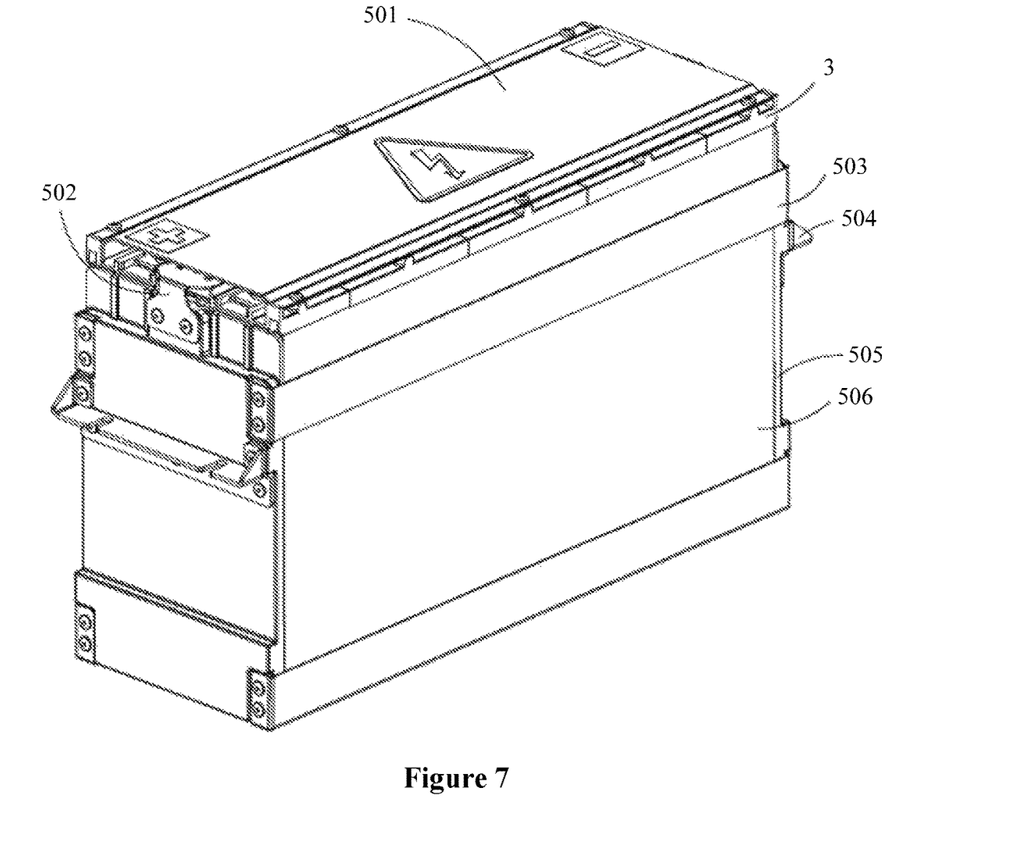
FIG. 7 is a schematic structural diagram of a battery module according to an embodiment of the disclosure.
Figure 8:
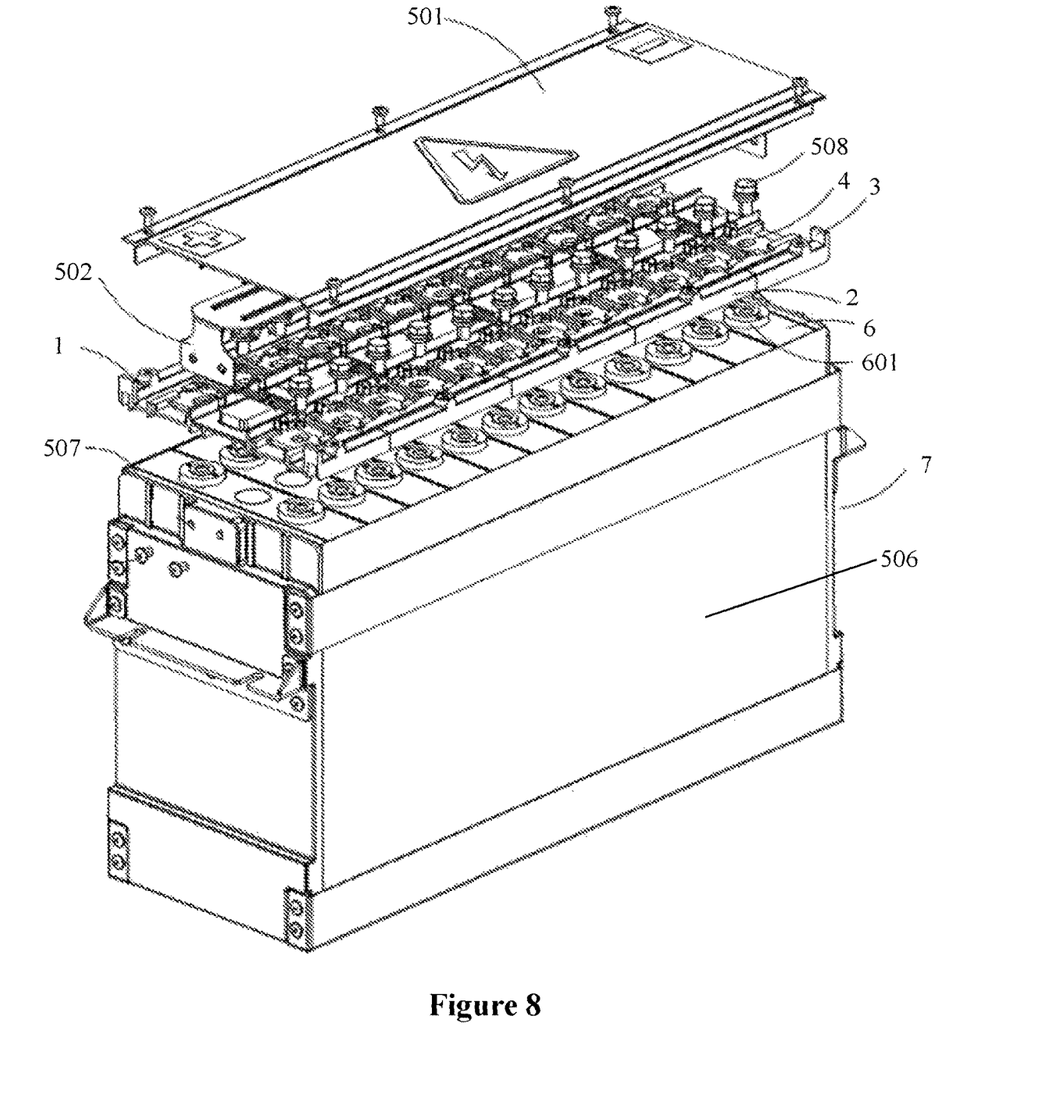
FIG. 8 is a schematic structural diagram of a battery module in decomposition according to an embodiment of the disclosure.
Figure 9:
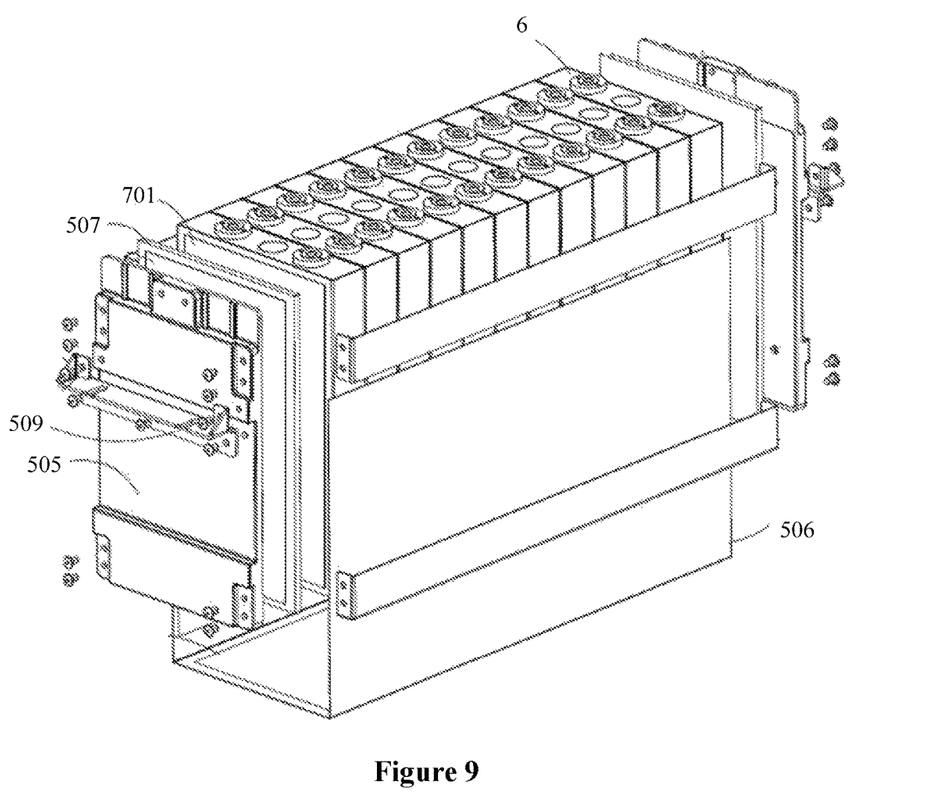
FIG. 9 is a schematic structural diagram of a box according to an embodiment of the disclosure.

Reference is made to FIG. 1 to FIG. 9. FIG. 1 is a schematic structural diagram of a front side of a first end insulating board according to an embodiment of the disclosure. FIG. 2 is a schematic structural diagram of a back side of a second end insulating board according to an embodiment of the disclosure. FIG. 3 is a schematic structural diagram of a front side of a middle insulating board according to an embodiment of the disclosure. FIG. 4 is a schematic structural diagram of a back side of a middle insulating board according to an embodiment of the disclosure. FIG. 5 is a schematic structural diagram of a conductive connection strip according to an embodiment of the disclosure. FIG. 6 is a schematic structural diagram of an insulating mother board according to an embodiment of the disclosure. FIG. 7 is a schematic structural diagram of a battery module according to an embodiment of the disclosure. FIG. 8 is a schematic structural diagram of a battery module in decomposition according to an embodiment of the disclosure. And FIG. 9 is a schematic structural diagram of a box according to an embodiment of the disclosure.

An insulating mother board according to an embodiment of the disclosure includes a first end insulating board 1, a middle insulating board 2 and a second end insulating board 3 connected in sequence. A first protrusion 101 is arranged on the left of a bottom of the first end insulating board 1, and a first groove 102 is arranged on the right of the bottom of the first end insulating board 1. A second groove 302 is arranged on the left of a top of the second end insulating board 3, and a second protrusion 301 is arranged on the right of the top of the second end insulating board 3. A middle first groove 202 is arranged on the left of a top of the middle insulating board 2, a middle first protrusion 201 is arranged on the right of the top of the middle insulating board 2, a middle second protrusion 203 is arranged on the left of a bottom of the middle insulating board 2, and a middle second groove 204 is arranged on the right of the bottom of the middle insulating board 2. The first protrusion 101, the second protrusion 301, the middle first protrusion 201 and the middle second protrusion 203 have a same structure. The first groove 102, the second groove 302, the middle first groove 202 and the middle second groove 204 have a same structure. The first protrusion 101 is inserted into the middle first groove 202, and the middle second protrusion 203 is inserted into the second groove 302. The second protrusion 301 is inserted into the middle second groove 302, and the middle first protrusion 201 is inserted into the first groove 102. The first protrusion 101 is a double layer stepped protrusion, and the first groove 102 is a double layer stepped groove. A connection hole 303 configured to connect a conductive connection strip 4 and a battery post 601 is arranged on each of the first end insulating board 1, the second end insulating board 3 and the middle insulating board 2. In the use of the insulating mother board, because the first end insulating board 1, the middle insulating board 2 and the second end insulating board 3 are moveably connected, an arbitrary number of middle insulating boards 2 can be arranged by arranging the first end insulating board 1 and the second end insulating board 3 on two ends of the insulating mother board respectively. There may be an arbitrary number of connection holes 303 on the first end insulating board 1, the middle insulating board 2 and the second end insulating board 3. Each connection hole 303 corresponds to one single battery 6, in this way, an assembly of different numbers of single batteries 6 can be achieved by only controlling the number of the middle insulating boards 2 and the connection holes 303. In addition, since the connection hole 303 is used to connect the conductive connection strip 4 and the battery post 601, an assembly of the single batteries 6 with different standards can be achieved at the same time. As long as the single battery 6 has the structure of the battery post 601, the assembly of the single batteries 6 with different standards can be completely achieved with the connection hole 303.

In addition, the first protrusion 101 is the double layer stepped protrusion, and the first groove 102 is the double layer stepped groove. Taking a side of the insulating mother board away from the single battery 6 when the insulating mother board covers the single battery 6 as an upper side, an upper protrusion of the double layer stepped protrusion is short, a lower protrusion of the double layer stepped protrusion is long, and correspondingly, an upper groove of the double layer stepped groove is short, a lower groove of the double layer stepped groove is long. When the double layer stepped protrusion is inserted into the double layer stepped groove, as shown in FIG. 2, the short protrusion is inserted into the upper groove and location of the protrusion is restricted by the groove, which can restrict movement of the first protrusion 101 in a horizontal direction; and the long protrusion is inserted into the lower groove and is blocked by a lower wall 305 of the upper groove, movement of the first protrusion 101 in a vertical direction is restricted. In this way, the connection is stable, and the usage effect is better.

The first end insulating board 1, the middle insulating board 2 and the second end insulating board 3 may be made of engineering plastic with good toughness and strength. Half of the connection hole 303 is arranged on each of the bottom of the first end insulating board 1, the top of the middle insulating board 2, the bottom of the middle insulating board 2 and the top of the second end insulating board 3, and all halves of connection holes 303 are butted to form integral connection holes 303 when the first end insulating board 1, the middle insulating board 2 and the second end insulating board 3 are connected in sequence. Certainly, besides halves of the connection holes 303 are arranged on the ends of the insulating boards, multiple integral connection holes 303 may be arranged on other parts. The usage effect is better only in a case that halves of the connection holes 303 are arranged on the ends of the insulating boards and halves of connection holes 303 may be butted to form integral connection holes 303 when any two of the first end insulating board 1, the middle insulating board 2 and the second end insulating board 3 are connected. The reason why halves of the connection holes 303 are arranged on the ends of the insulating boards is to ensure the function implementation and structural strength of each part of each insulating board.

In order to further optimize the above solution, two rows of connection holes 303 are arranged with an interval on each of the first end insulating board 1, the second end insulating board 3 and the middle insulating board 2. A first connection board 105 is arranged between the two rows of the connection holes 303 of the first end insulating board 1, and a first boss and a first recess are arranged at a bottom of the first connection board 105 side by side. A second connection board 309 is arranged between the two rows of the connection holes 303 of the second end insulating board 3, and a second boss and a second recess 304 are arranged at a top of the second connection board 309 side by side. A middle connection board 206 is arranged between the two rows of the connection holes 303 of the middle insulating board 2, a first middle boss and a first middle recess 205 are arranged at a top of the middle connection board 206 side by side, and a second middle boss 207 and a second middle recess are arranged at a bottom of the middle connection board 206 side by side. The first boss is inserted into the first middle recess 205, the first middle boss is inserted into the first recess, the second boss is inserted into the second middle recess, and the second middle boss is inserted into the second recess 304. In this way, the location may be restricted in both the horizontal direction and the vertical direction, as shown in FIG. 4, and the connection strength may be further enhanced.

In order to further optimize the above solution, a wire slot 104 is arranged on a side of each of the first connection board 106, the second connection board 309 and the middle connection board 206. An integral wire slot 104 may be formed when the first connection board 106, the second connection board 309 and the middle connection board 206 are assembled to form the insulating mother board, and the integral wire slot 104 may be used to receive a signal line. Specifically, two grooves may be arranged on edges of both sides at an end of the first connection board 106, the second connection board 309 and the middle connection board 206, as shown in FIG. 1, a wire card fixing hole 103 for fixing a wire card is arranged on the first connection board 106, the second connection board 309 and the middle connection board 206, the wire card may fix and protect the signal line.

In order to further optimize the above solution, the first protrusion 101 is a trapezoid protrusion, and the first groove 102 is a trapezoid groove, and in this way, the first protrusion 101 and the first groove 102 may be stuck well together.

An insulating harness mother board assembly is further provided according to an embodiment of the disclosure, which includes a conductive connection strip 4 and any one of the insulating mother boards described above. The conductive connection strip 4 covers a same row of connection holes 303 on the first end insulating board 1, the second end insulating board 3 and the middle insulating board 2. An assembly of different numbers of the single batteries 6 and an assembly of the single batteries 6 with different standards can be achieved.

A through hole 401 is arranged in a part 402 of the conductive connection strip 5 covering the connection hole 303, and a check bolt 508 passes through the through hole 401 and is screwed into the battery post 601 having an internally threaded hole, which makes connection more convenient. In a case that the battery post 601 does not have the internally threaded hole, the battery post 601 and the conductive connection strip 4 may be connected and fixed by means of welding. In order to make it convenient to fix the conductive connection strip 4 to the insulating mother board, multiple fixed snap fits 306 and moveable snap fits 307 may be arranged on the insulating mother board, and the fixed snap fits 306 and the moveable snap fits 307 cooperate to fix the conductive connection strip 4. A locating hole 403 is arranged on the conductive connection strip 4, a locating pin 308 is arranged on the insulating mother board, which can achieve position of the conductive connection strip 4 and restrict a movement space of the conductive connection strip 4 to prevent two conductive connection strips 4 which are not allowed to touch from touching each other.

A battery module is further provided according to an embodiment of the disclosure, which includes a box 7, a single battery 6 and any one of the insulating harness mother board assemblies described above. Multiple single batteries 6 forms a battery assembly and the battery assembly is placed in the box 7, the insulating harness mother board assembly lies above the single battery 6, an assembly of different numbers of the single batteries 6 and an assembly of the single batteries 6 with different standards can be achieved.

Specifically, the insulating harness mother board assembly is fixed to the box 7 via an upper hold-down strip 502, an insulating cover 501 having a protecting and identifying effect is above the insulating harness mother board assembly, and the insulating cover 501 is fixed to the insulating harness mother board assembly via a mounting nail.

The bottom and side walls of the box 7 may be embodied as a U-shaped insulating board 506, two ends of the U-shaped insulating board 506 are sealed by an end fixing board 505. The U-shaped insulating board 506 may be fixed to the battery assembly with each other via a structural adhesive 701, and the U-shaped insulating board 506 may have a good insulation and protection effect on the battery assembly to avoid damage and leakage of electricity occurring in the bottom and lateral surface of each single battery 6. Multiple side hold-down strips 503 are arranged at the outside of the U-shaped insulating board 506, and each side hold-down strip 503 surrounds the outer wall of one side of the U-shaped insulating board 506 and is fixed to the outer wall of two end fixing boards 505. The multiple side hold-down strips 503 may assist to fix the battery set and enhance fastness of the entire battery assembly components. A shape of the side hold-down strip 503 is a C-shaped structure, so that the side hold-down strip 503 can surround the lateral surface of the U-shaped insulating board 506 when two ends of the side hold-down strip 503 are fixed to two end fixing boards 505 respectively. Preferably, connection among all the components on the box 7 adopts self-plugging rivet connection.

Any two single batteries 6 are fixed to each other by means of a structural adhesive 701, cushioning pads 507 are arranged between the single battery 6 and two ends of the box 7, the cushioning pads 507 and the single battery 6 are fixed to each other by means of the structural adhesive 701, and the cushioning pads 507 and the box 7 are fixed to each other by means of the structural adhesive 701. Specifically, the cushioning pad 507 and the end fixing board 505 are fixed by means of the structural adhesive 701, and the inner board surface on which the end fixing board 505 fits the cushioning pad 507 is a plane, which facilitates the end fixing board 505 to be bonded and fixed to the cushioning pad 507. The structural adhesive 701 has a good fixing effect and a long lifetime, and good elasticity of the cushioning pad 507 compensates a length tolerance of multiple single batteries 6 after the multiple single batteries 6 are arranged and stacked, which facilitates to install other components subsequently. The cushioning pad 507 is in a square with a uniform thickness and is made of rubber material having good elasticity.

In order to further optimize the above solution, a mounting ear 504 is arranged on an outer wall at each of two ends of the box 7, and a mounting hole 509 is arranged on the mounting ear 504. The entire battery assembly components may be fixed to a battery box or other operating environment via the mounting hole 509. Both the end fixing board 505 and the mounting ear 504 may be made of metal material, and may be formed by a manner combining casting and sheet-metal working.

According to the battery module provided by the embodiments of the disclosure, the insulating harness mother board assemblies for different length requirements may be implemented by combining a variable number of the middle insulating boards 2, that is, the flexibility of assembling the module in different requirements is improved on the premise of not adding the categories of components. By using the U-shaped insulating board 506 to completely cover the battery assembly and using a simple side hold-down strip 503, the weight and size of the module are reduced on the premise of ensuring that the battery assembly is insulated and protected, which improves energy density of the battery module.

According to the description of the disclosed embodiments, the disclosure can be implemented or used by a person of skills in the art. Various modifications made to these embodiments may be apparent for persons of skills in the art, and a normal principle defined in the disclosure may be implemented in other embodiments without departing from the spirit or scope of the disclosure. Therefore, the disclosure is not limited to the embodiments described herein but confirms to a widest scope in accordance with principles and novel features disclosed in the disclosure.

The invention claimed is:

1. An insulating mother board comprising a first end insulating board, a middle insulating board and a second end insulating board connected in sequence, wherein
   a first protrusion is arranged on the left of a bottom of the first end insulating board, and a first groove is arranged on the right of the bottom of the first end insulating board,
   a second groove is arranged on the left of a top of the second end insulating board, and a second protrusion is arranged on the right of the top of the second end insulating board,
   a middle first groove is arranged on the left of a top of the middle insulating board, a middle first protrusion is arranged on the right of the top of the middle insulating board, a middle second protrusion is arranged on the left of a bottom of the middle insulating board, and a middle second groove is arranged on the right of the bottom of the middle insulating board,
   the first protrusion, the second protrusion, the middle first protrusion and the middle second protrusion have a same structure,
   the first groove, the second groove, the middle first groove and the middle second groove have a same structure,
   the first protrusion is inserted into the middle first groove, and the middle second protrusion is inserted into the second groove,
   the second protrusion is inserted into the middle second groove, and the middle first protrusion is inserted into the first groove,
   the first protrusion is a double layer stepped protrusion, and the first groove is a double layer stepped groove, and
   a connection hole configured to connect a conductive connection strip and a battery post is arranged on each of the first end insulating board, the second end insulating board and the middle insulating board;
   wherein two rows of connection holes are arranged with an interval on each of the first end insulating board, the second end insulating board and the middle insulating board,
   a first connection board is arranged between the two rows of the connection holes of the first end insulating board, and a first boss and a first recess are arranged at a bottom of the first connection board side by side,
   a second connection board is arranged between the two rows of the connection holes of the second end insulating board, and a second boss and a second recess are arranged at a top of the second connection board side by side,
   a middle connection board is arranged between the two rows of the connection holes of the middle insulating board, a first middle boss and a first middle recess are arranged at a top of the middle connection board side by side, and a second middle boss and a second middle recess are arranged at a bottom of the middle connection board side by side, and
   the first boss is inserted into the first middle recess, the first middle boss is inserted into the first recess, the second boss is inserted into the second middle recess, and the second middle boss is inserted into the second recess.

2. The insulating mother board according to claim 1, wherein half of the connection hole is arranged on each of the bottom of the first end insulating board, the top of the middle insulating board, the bottom of the middle insulating board and the top of the second end insulating board, and all halves of connection holes are butted to form integral connection holes when the first end insulating board, the middle insulating board and the second end insulating board are connected in sequence.

3. The insulating mother board according to claim 1, wherein a wire slot is arranged on a side of each of the first connection board, the second connection board and the middle connection board.

4. The insulating mother board according to claim 1, wherein the first protrusion is a trapezoid protrusion, and the first groove is a trapezoid groove.

5. An insulating harness mother board assembly comprising an insulating mother board and a conductive connection strip, wherein:
   the insulating mother board comprises a first end insulating board, a middle insulating board and a second end insulating board connected in sequence,
   a first protrusion is arranged on the left of a bottom of the first end insulating board, and a first groove is arranged on the right of the bottom of the first end insulating board,
   a second groove is arranged on the left of a top of the second end insulating board, and a second protrusion is arranged on the right of the top of the second end insulating board,
   a middle first groove is arranged on the left of a top of the middle insulating board, a middle first protrusion is arranged on the right of the top of the middle insulating board, a middle second protrusion is arranged on the left of a bottom of the middle insulating board, and a middle second groove is arranged on the right of the bottom of the middle insulating board, the first protrusion, the second protrusion, the middle first protrusion and the middle second protrusion have a same structure, the first groove, the second groove, the middle first groove and the middle second groove have a same structure, the first protrusion is inserted into the middle first groove, and the middle second protrusion is inserted into the second groove, the second protrusion is inserted into the middle second groove, and the middle first protrusion is inserted into the first groove, the first protrusion is a double layer stepped protrusion, and the first groove is a double layer stepped groove, and a connection hole configured to connect the conductive connection strip and a battery post is arranged on each of the first end insulating board, the second end insulating board and the middle insulating board, and the conductive connection strip covers a same row of connection holes on the first end insulating board, the second end insulating board and the middle insulating board, wherein two rows of connection holes are arranged with an interval on each of the first end insulating board, the second end insulating board and the middle insulating board, a first connection board is arranged between the two rows of the connection holes of the first end insulating board, and a first boss and a first recess are arranged at a bottom of the first connection board side by side, a second connection board is arranged between the two rows of the connection holes of the second end insulating board, and a second boss and a second recess are arranged at a top of the second connection board side by side, a middle connection board is arranged between the two rows of the connection holes of the middle insulating board, a first middle boss and a first middle recess are arranged at a top of the middle connection board side by side, and a second middle boss and a second middle recess are arranged at a bottom of the middle connection board side by side, and the first boss is inserted into the first middle recess, the first middle boss is inserted into the first recess, the second boss is inserted into the second middle recess, and the second middle boss is inserted into the second recess.

6. The insulating harness mother board assembly according to claim 5, wherein a through hole is arranged in a part of the conductive connection strip covering the connection hole, and a check bolt passes through the through hole and is screwed into the battery post having an internally threaded hole.

7. A battery module comprising an insulating harness mother board assembly, a box and a single battery, wherein:
the insulating harness mother board assembly comprises an insulating mother board and a conductive connection strip,
the insulating mother board comprises a first end insulating board, a middle insulating board and a second end insulating board connected in sequence,
a first protrusion is arranged on the left of a bottom of the first end insulating board, and a first groove is arranged on the right of the bottom of the first end insulating board,
a second groove is arranged on the left of a top of the second end insulating board, and a second protrusion is arranged on the right of the top of the second end insulating board,
a middle first groove is arranged on the left of a top of the middle insulating board, a middle first protrusion is arranged on the right of the top of the middle insulating board, a middle second protrusion is arranged on the left of a bottom of the middle insulating board, and a middle second groove is arranged on the right of the bottom of the middle insulating board,
the first protrusion, the second protrusion, the middle first protrusion and the middle second protrusion have a same structure,
the first groove, the second groove, the middle first groove and the middle second groove have a same structure,
the first protrusion is inserted into the middle first groove, and the middle second protrusion is inserted into the second groove,
the second protrusion is inserted into the middle second groove, and the middle first protrusion is inserted into the first groove,
the first protrusion is a double layer stepped protrusion, and the first groove is a double layer stepped groove, and
a connection hole configured to connect the conductive connection strip and a battery post is arranged on each of the first end insulating board, the second end insulating board and the middle insulating board, and
the conductive connection strip covers a same row of connection holes on the first end insulating board, the second end insulating board and the middle insulating board, and
the single battery is placed in the box, and the insulating harness mother board assembly lies above the single battery;
wherein two rows of connection holes are arranged with an interval on each of the first end insulating board, the second end insulating board and the middle insulating board,
a first connection board is arranged between the two rows of the connection holes of the first end insulating board, and a first boss and a first recess are arranged at a bottom of the first connection board side by side,
a second connection board is arranged between the two rows of the connection holes of the second end insulating board, and a second boss and a second recess are arranged at a top of the second connection board side by side,
a middle connection board is arranged between the two rows of the connection holes of the middle insulating board, a first middle boss and a first middle recess are arranged at a top of the middle connection board side by side, and a second middle boss and a second middle recess are arranged at a bottom of the middle connection board side by side, and
the first boss is inserted into the first middle recess, the first middle boss is inserted into the first recess, the second boss is inserted into the second middle recess, and the second middle boss is inserted into the second recess.

8. The battery module according to claim 7, wherein any two single batteries are fixed to each other by means of a structural adhesive, cushioning pads are arranged between the single battery and two ends of the box, the cushioning pads and the single battery are fixed to each other by means of the structural adhesive, and the cushioning pads and the box are fixed to each other by means of the structural adhesive.

9. The battery module according to claim 7, wherein a mounting ear is arranged on an outer wall at each of two ends of the box, and a mounting hole is arranged on the mounting ear.

* * * * *